United States Patent
Mortensen et al.

(10) Patent No.: US 10,332,495 B1
(45) Date of Patent: Jun. 25, 2019

(54) IN VEHICLE KARAOKE

(71) Applicant: Byton Limited, Hong Kong (HK)

(72) Inventors: Peter Mortensen, Santa Clara, CA (US); Mischa Gentry, Castroville, CA (US)

(73) Assignee: BYTON LIMITED, Hong Kong (HK)

( * ) Notice: Subject to any disclaimer, the term of this patent is extended or adjusted under 35 U.S.C. 154(b) by 0 days.

(21) Appl. No.: 16/031,264

(22) Filed: Jul. 10, 2018

(51) Int. Cl.
*G10H 1/36* (2006.01)
*G10H 1/00* (2006.01)

(52) U.S. Cl.
CPC ........... *G10H 1/361* (2013.01); *G10H 1/0008* (2013.01); *G10H 2220/096* (2013.01)

(58) Field of Classification Search
CPC . G10H 1/361; G10H 1/0008; G10H 2220/096
USPC ........................................ 84/610; 434/307 A
See application file for complete search history.

(56) References Cited

U.S. PATENT DOCUMENTS

| | | | | |
|---|---|---|---|---|
| 5,885,085 A * | 3/1999 | Fujita | ...................... | G10H 1/365 340/901 |
| 6,351,698 B1 * | 2/2002 | Kubota | ............... | B60R 16/0231 340/988 |
| 9,076,421 B1 * | 7/2015 | Munoz | .................... | G10H 1/361 |
| 2003/0117531 A1 * | 6/2003 | Rovner | .................. | G10H 1/361 348/729 |
| 2004/0028374 A1 * | 2/2004 | Shen | ...................... | G11B 31/00 386/234 |
| 2004/0116069 A1 * | 6/2004 | Fadavi-Ardekani | ... | H04H 40/90 455/3.02 |
| 2006/0050894 A1 * | 3/2006 | Boddicker | ............. | B60N 3/005 381/77 |
| 2006/0052167 A1 * | 3/2006 | Boddicker | ............. | B60N 3/005 463/37 |
| 2006/0088810 A1 * | 4/2006 | Yeh | ........................ | G10H 1/361 434/307 A |
| 2006/0228683 A1 * | 10/2006 | Jianping | ............... | G10H 1/366 434/307 A |
| 2006/0251262 A1 * | 11/2006 | Lee | ...................... | G10H 1/0083 381/2 |
| 2007/0234888 A1 * | 10/2007 | Rotolo de Moraes | ....................... | G10H 1/361 84/730 |
| 2009/0268093 A1 * | 10/2009 | Ishihara | ................... | H04N 7/18 348/564 |
| 2011/0188673 A1 * | 8/2011 | Sim | ........................ | G10H 1/361 381/102 |
| 2017/0185362 A1 * | 6/2017 | Cansino | .......... | H04N 21/41422 |
| 2017/0372686 A1 * | 12/2017 | Rajendran | ............. | G10H 1/365 |
| 2018/0122349 A1 * | 5/2018 | Blackburn | ............. | G10H 1/361 |

* cited by examiner

*Primary Examiner* — Jeffrey Donels
(74) *Attorney, Agent, or Firm* — Womble Bond Dickinson (US) LLP

(57) ABSTRACT

Disclosed in improved in vehicle karaoke that receives a request from a user in a vehicle to play a karaoke song and displaying, to at least the user, an interface showing text of the selected song. In vehicle karaoke can record, with a microphone in the interior of the vehicle, audio of a performance of the song by the user and overlay the recording with the selected song over a speaker interior of the vehicle.

25 Claims, 7 Drawing Sheets

IN VEHICLE KARAOKE

TECHNICAL FIELD

The disclosed embodiments relate generally to providing entertainment systems in vehicles.

BACKGROUND

Karaoke systems provide opportunities for users to practice singing and performing various songs as a lead singer while the music plays. Traditional karaoke systems can be found at restaurants and bars. Newer karaoke systems include telephone booth like units with glass windows and a door allowing participants to enter and perform karaoke in public places. These newer karaoke systems provide a noise sealed box where participants perform to songs available at that location. This type of newer karaoke systems can, for example be found at shopping malls, railway stops, or other locations. Additionally, karaoke can be implemented in more personalized settings at home or elsewhere using smart TVs, mobile devices, personal computers, laptops, or tablets. Some of these systems may be portable and can be used while traveling or in a variety of locations. Karaoke systems often include specialized audio processing to improve the audio fidelity of a performance by reducing noise and acoustic feedback while offering special voice enhancing features like reverb and tonal changes. With the growth of smart devices, karaoke has gone online allowing sharing the performance with friends and family across the internet.

SUMMARY

The disclosure describes embodiments of improved in vehicle karaoke. In vehicle karaoke can receive a request from a user in a vehicle to play a karaoke song and displaying, to at least the user, an interface showing lyrics of the selected song. In vehicle karaoke can record, with a microphone in the interior of the vehicle, audio and optionally video of a performance of the song by the user and overlay the recording with the selected song over a speaker interior of the vehicle.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Disclosed is in-vehicle karaoke that provides an improved karaoke experience based on improved technology available in vehicle systems. Furthermore, unique characteristics of vehicles provide additional opportunities for features that are unavailable in traditional karaoke systems. For some embodiments, a vehicle can include an entertainment system operated by a computer processor that provides control of user interfaces. The user interfaces provide an interactive karaoke platform to enable users to view lyrics. The users can then sing along with the lyrics and music. That singing can then be played over the vehicle's speakers, transmitted to other devices, or recorded to be viewed or transmitted at another time.

For some embodiments, the entertainment system can provide different levels of karaoke experience based on the mode of driving through avoiding driver distractions on the displays while the driver needs to focus on driving the vehicle. A fully immersive experience can be provided when the vehicle is stopped in a parked mode. A minimal experience can be provided to a driver of a vehicle while the vehicle is being driven manually. For example, the minimal experience may operate using voice control and which does not display lyrics for the driver. Additional driving modes can be provided. For example, a passenger may view lyrics on a smaller portion of a display screen than if the vehicle was in a parked mode. For some embodiments, the karaoke experience can provide a fully immersive experience for drivers and passengers when the vehicle is operating in a fully autonomous driving mode.

For some embodiments, the operation of karaoke in a vehicle may be dictated in part by location or user data available to the entertainment system. For example, the user data can provide an indication of upcoming events, such as concerts. The entertainment system can then determine a playlist based on the upcoming event. The upcoming events can also include an indication of other vehicles or users that are attending the event. These users can be grouped to form a karaoke group that can view and sing songs together before or after the event. For example, they can be provided a location to meetup, such as a parking lot, before or after a concert to sing songs related to the concert. For some embodiments, vehicles sharing a road may also be grouped together to sing songs with passengers in nearby vehicles.

The vehicle with karaoke systems can include many different types of vehicles including cars, busses, sports utility vehicles, minivans, vans, trucks, etc. The vehicles can have various types of propulsion systems including electric motor, internal combustion engines, diesel engines, hybrid electric engines, etc.

Figure 1:
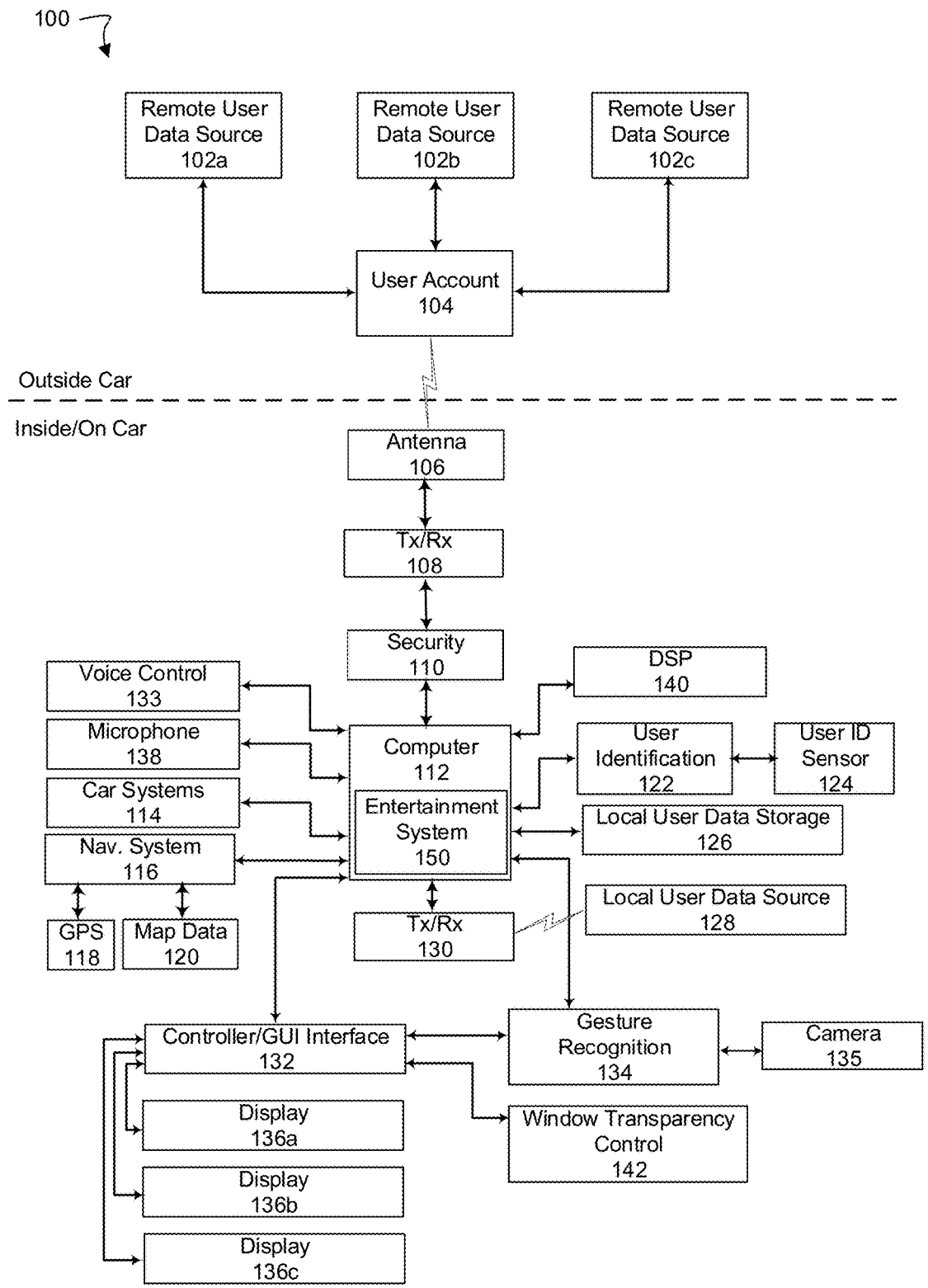
FIG. 1 is a schematic diagram of an embodiment of systems to provide karaoke in a vehicle, which can be used in accordance with some embodiments.

FIG. 1 illustrates an embodiment of vehicle systems 100 providing in vehicle karaoke experiences. Vehicle systems 100 include elements outside the vehicle as well as elements inside or on the vehicle. Outside the vehicle, a user account 104 can be coupled to one or more remote user data sources 102a-102c to exchange data with the remote user data sources. User account 104 can receive data from, transmit data to, and process data exchanged with remote user data sources. User account 104 can, for example, be an account established on servers set up by the vehicle manufacturer. Remote user data sources 102a-102c can include user accounts established on remoter servers such as a user's contacts, calendar, health-related accounts, and social media accounts. In other embodiments user account 104 can be omitted and its functions of assembling the events and their datasets can instead be performed by computer 112. In such cases, transceiver 108 can communicate directly with remote user data sources 102a-102c through antenna 106, rather than communicating with the remote user data sources through user account 104.

User account 104 is set up by the user and linked to remote user data sources 102a-102c so that user account 104 can retrieve data from remote user data sources 102a-102c to determine what events a user has upcoming and so that user account 104 can use the retrieved data to assemble a dataset for each event. For one embodiment, the dataset for each event can include at least a starting time, an ending time, and a location. For example, events can include concerts, sporting events, or other events in a calendar of user account 104. For other embodiments the dataset can also include additional data, such as names, photos, and contact information for people associated with each event. By aggregating information this way, the mapping scheme makes information from various apps accessible on a single display.

For instance, user account 104 could retrieve appointments from a user's calendar. The events retrieved from the calendar might include location information, but if location data cannot be found in the calendar, then user account 104 can obtain that information from a different remote user data source, such as the user's contacts or social media account, or by searching the Internet. For example, if an event on the user's calendar is a concert, but the calendar has no location for the concert, user account 104 can access another user data source—searching the artists name on the internet, for instance—to establish a location for the concert. If a location for an event cannot be found in a remote data source, the location can be requested from the user or another source.

Inside the vehicle, a computer 112 is communicatively coupled to various elements including a transceiver 108 via security gateway 110; vehicle systems 114; a navigational system 116 that includes a position sensor or GPS 118 as well as a database including map data 120; a user identification system 122 coupled to one or more user ID sensors 124; a local user data storage 126 and a second transceiver 130 through which computer 112 can exchange data with a local user data source 128. A controller/graphic user interface (GUI) interface 132 is communicatively coupled to computer 112, and one or more displays 136a-136c are coupled to controller/GUI interface 132. A user input device such as gesture recognition system 134 with at least one camera 135 is also communicatively coupled to computer 112.

Computer 112 is the hub of system 100. In the illustrated embodiment computer 112 is a programmable general-purpose computer that includes at least memory, one or more microprocessors, and storage. Other embodiments, however, can include one or more other types of computers, such as application specific integrated circuits (ASIC). For some embodiments, computer 112 may include a microprocessor system optimized for wireless performance. Although represented as a single computer in the illustrated embodiment, in other embodiments computer 112 can include multiple processors or can comprise multiple separate computers that can communicate and coordinate with each other. In the illustrated embodiment the elements communicatively coupled to computer 112 are represented as components separate from the computer, but in other embodiments one or more of these other components can be implemented in software and run on the computer 112. In other words, one or more of the elements communicatively coupled to computer 112 can actually be processes running on computer 112.

Transceiver 108 is communicatively coupled via security gateway 110 to computer 112. Transceiver 108 is also coupled to antenna 106 to allow it to wirelessly exchange data with user account 104, for instance via Wi-Fi, cellular, or satellite communication. Security gateway 110 is communicatively coupled in the link between transceiver 108 and computer 112 to avoid downloading viruses, malicious code, or other data that could damage system 100 or, in particular, that could adversely influence vehicle systems 114 and thus compromise vehicle safety. The security gateway 110 may also provide additional protection from attempted hackers of one or more vehicle systems 100. For example, the gateway 110 may protect data of the entertainment system 150 such as recordings of a karaoke performance, data regarding use of the entertainment system 150, connections of the users within the entertainment system 150, or the like. Security gateway 110 in one embodiment can be a computer running software such as anti-virus or anti-malware software.

User identification system 122 is coupled to one or more user ID sensors 124, and together they are used to identify authorized users of system 100. In one embodiment user ID sensor 124 can include one or more facial recognition cameras, but in other embodiments other types of sensors such as biometric sensors (e.g., fingerprint or retinal scan) can be used. In still other embodiments, user identification system 122 can be the traditional username/password system in which a user enters their username and password via a keypad or other user input system. For some embodiments, the user identification system 122 can also use input from microphone 138 to identify users using voice identification. User ID sensors 124 can be positioned inside or outside the vehicle (see, e.g., FIGS. 3A-3C) and used to identify the driver and/or passengers in the vehicle, all of whom can be users of interactive mapping system 100. The user identification system 122 can be used to sign into user account 104. For example, the user identification system 122 can log one or more users in the vehicle into a karaoke system. The user account 104 can access playlists, previous performances, recordings, selected songs, or the like from one of remote user data sources 102a-102c in order to provide an in-vehicle karaoke personalized experience.

Vehicle systems 114 are coupled to computer 112 so that they can be controlled and/or adjusted by the driver or passengers of the vehicle. Among other things, vehicle systems 114 can include those that control the engine, steering, suspension, air-conditioning, interior lighting, exterior lighting, locking, and so on.

Navigation system 116 is coupled to computer 112 to provide navigation capability for the vehicle. Among other things, navigation system 116 includes a position sensor such as a global positioning system (GPS) system 118, as well as a database that includes map data 120. Map data 120 can be commercially available map data obtained from map data sources such as Google, Bing (Microsoft), TomTom, Garvin, etc. Navigation system 116 uses GPS 118 to determine the current position of the vehicle and uses map data 120 to show the current position of the vehicle on a map, as well as the map locations of future events, on at least one of displays 136a-136c.

Local user data storage 126 is coupled to computer 112 to locally store data retrieved from user account 104. The data stored in local user data storage 126 may be raw data obtained directly from user account 104, or can be data that has been further processed by computer 112. Data stored in local user data storage 126 can be used to store user data relevant to entertainment system 150 to provide a karaoke experience. For example local user data storage 126 can include playlists, song recordings, or other information to improve a karaoke experience. For some embodiments, local user data storage 126 can include downloaded or cached songs and lyrics for use by entertainment system 150. For example, if a user is aware that certain portions of a drive lack quality wireless connections, certain playlists can be stored in local user data storage 126 for access during those portions of the drive.

For some embodiments, rather than obtain user data from remote user data sources 102a-102c through user account 104, it may be desirable to obtain the user data from a local user data source 128. In one embodiment, local user data source 128 can be a mobile phone that the user carries with them in the vehicle. Local user data source 128 can have versions of remote user data sources 102a-102c on it, as well as a version of user account 104. For instance, if remote data source 102a is a karaoke application, and the user has a related karaoke application on their mobile phone, then the karaoke application in remote data source can sync with the karaoke application on local user data source 128. For some embodiments, it could be necessary to use local user data source 128 if, for instance, a connection cannot be established between transceiver 108 and user account 104 or between user account 104 and remote user data sources 102.

Transceiver 130 is coupled to computer 112 to access data from local user data source 128 and transfer it to local user data storage 126. Local user data source 128 can then communicate, wirelessly or by wire, with transceiver 130. Wireless communication between local user data source 128 and transceiver 130 can be accomplished, for instance, using short-range wireless protocols such as Bluetooth, but in other embodiments it can communicate using other wireless communication formats such as Wi-Fi.

Controller/graphic user interface (GUI) 132 is coupled to computer 112 and is also coupled to at least one display. In the illustrated embodiment three displays 136a-136c are coupled to controller/GUI interface 132, but in other embodiments the number of displays coupled to the interface can be different than shown. Although illustrated and referred to as separate displays, displays 136a-136c can be different parts of a single display. As further discussed below, one of displays 136a-136c can be used to display features of an in vehicle karaoke experience. For example one of displays 136a-136c can be used to show lyrics of a selected song. For some embodiments, other displays may also display lyrics of a song, video of a person singing a song, or other features of a karaoke experience.

A gesture recognition system 134 coupled to one or more cameras 135 serves as a user input device for users within the automobile to interact with the system 100, in particular to interact with the timeline/map display and other displays. In other embodiments other user input devices can be used, instead of or in addition to gesture recognition system 134, to perform the same functions and actions that can be performed with gesture recognition system 134. For example, displays 136a-136c may be touchscreen to enable user touches to interact with vehicle systems 100.

Gesture recognition system 134 is coupled to computer 112 and for some embodiments can be directly coupled to controller/GUI interface 132. The one or more cameras 135 coupled to gesture recognition system 134 can be located in various places within a vehicle's cabin. For instance, in one embodiment that there can be cameras for the driver and every passenger. The one or more cameras 135 can capture gestures, motions, or gesture/motion combinations made by the driver and one or more of the passengers. For one embodiment the gestures and motions can be hand gestures and motions, but other embodiments can be facial gestures and motions. For other embodiments, both facial and hand gestures can be used. The gesture control essentially provides a remote touch pad. Examples of hand gestures that can be used are the user zooms in with gestures by grabbing and pulling towards the user; moving the user hand up and down, and left and right, to move objects up and down, and left and right; and rotating objects such as the map with a scoop gesture.

In addition to gesture controls and touch screen, a user may interact with computer 112 using microphone 138. For some embodiments, recordings from microphone 138 may be analyzed by digital signal processor (DSP) 140. The output of the DSP 140 can then be used by the computer 112 to determine an action requested by a user in the vehicle. For example, voice control 133 can interpret the input from microphone to determine an action to take based on the voice input. Such actions can include opening an application to implement a karaoke system, selecting a song, pausing a song, fast-forwarding or re-winding a song, increasing or decreasing volume, or other interactions with entertainment system 150. For some embodiments, the output of microphone 138 may be used for interactions with other vehicle systems 100.

While shown as a single microphone 138, the microphone 138 may actually be multiple microphones to improve listening in various parts of the vehicle. For example, the microphone 138 may include a microphone array that can be used to cancel out noise and reduce feedback. The microphone 138 operating as a microphone array can also use beamforming or other directional audio technology to further isolate one or more singers within the vehicle. In addition, the microphone 138 may be hardwired to the vehicle or may be a Bluetooth or other type of microphone with a wireless connection to computer 112 (e.g., through transceiver 130). For some embodiments, the microphone 138 may also be part of local user data source 128.

Entertainment system 150 can provide various entertainment options for users of the vehicle. Although shown as part of computer 112, the entertainment system 150 may be a separate system that is in communication with the computer 112 and related vehicle systems 100. The entertainment system 150 provides a karaoke experience for users of the vehicle. The karaoke experience can include playing a selected song and scrolling associated lyrics on one or more of displays 136a-136c. The entertainment system then overlays signals received through microphone 138 over the song as it is playing. For some embodiments, a video output can also be provided over the displays 136a-136c.

For some embodiments, the entertainment system 150 can also share the recorded audio with other vehicles or devices. For example, the entertainment system 150 can transmit audio recordings of one or more singers in the vehicle through user account 104 to another vehicle or device. The entertainment system 150 may provide a recording of one or more singers in the vehicle to another vehicle that overlays the recording with the selected song. For some embodiments, the entertainment system 150 may record the performance of a user as well as the song that is played. Accordingly, the entertainment system 150 can then share a single recording of the user's performance as well as the audio of the song. Thus, another vehicle, mobile device, home entertainment system, or the like can receive the recording over a network and play that recording. For some embodiments, prior to starting a song, the user can select a contact or connection from user account 104 and select sharing to those contacts. In addition, the entertainment system 150 may search for other users in different locations with similar taste in music to suggest sharing a karaoke session with. For some embodiments this can also include using GPS or other navigation data to find people in a nearby proximity that have similar tastes. For some embodiments, video captured from camera 135 can also be transmitted to other devices or vehicles. The entertainment system 150 can also simultaneously receive audio or visual data from the other vehicle or device to enable singing in chorus between one or more individuals in each or the vehicles.

The entertainment system 150 can also receive recordings from other vehicles or devices to display on one or more of displays 136a-136c. For some embodiments, this can include video data of the recording, audio data of a performance, or other data of the performance from another vehicle or device. The entertainment system 150 can also show the lyrics and project the recording through speakers at the same time. The users may search for live recordings to listen to through the user's contacts in user account 104, GPS data of other users of the karaoke system, by searching for a particular song, artist, or genre, or based on other means.

For some embodiments, the entertainment system 150 can use navigation data from navigation system 116 to find other users to sing karaoke with. For example, a user can search through entertainment system 150 in a remote data source for nearby individuals with similar taste in music. The entertainment system 150 can identify nearby users and link vehicles or mobile devices together. Those users can then share a karaoke experience. For some embodiments, the entertainment system 150 can also use navigation system 116 to identify a nearby location that is suitable to meet and share karaoke. For example the navigation system 116 can identify a parking lot where one or more connected vehicles can meet to sing karaoke.

For some embodiments, the entertainment system 150 can use event data to improve the karaoke experience. For example, if user account 104 includes user data indicating that the user is attending a concert, or navigation system 116 is currently routing toward a concert, the entertainment system 150 may select songs accordingly. In addition, the entertainment system 150 may recommend stopping in a parking lot or arriving at an event early to perform karaoke prior to the event. For some embodiments, the entertainment system 150 may recommend to connect with other users in other vehicles that are also attending the event.

For some embodiments, the entertainment system 150 can provide an interactive mapping experience that shows other karaoke users on a mapping system. For example, the entertainment system 150 can display other vehicles or devices singing karaoke and a location on an interactive map. The entertainment system 150 can provide the current song selection, a genre preference, any scores or records, or the like on the map for each of the users on the map. The entertainment system can also filter users on the map by genre, age, gender, or other user data. The entertainment system 150 may also allow users to adjust privacy settings to determine whether to share certain information. For example, a user may decide to share profile information or not. The user may also determine whether to allow performances to be viewed publicly, by friends, or only by the user.

For safety concerns, the entertainment system 150 can provide different experiences based on current driving status. The entertainment system 150 may receive feedback from computer 112 or vehicle systems 114 indicating a current driving mode of the vehicle. For example, the entertainment system 150 can provide a fully immersive experience while the vehicle is parked. This can include full display of lyrics across a front display of the vehicle, video displays that play along with the song, and enabling singing by the driver. For some embodiments, the same features may be enabled for a fully autonomous vehicle. If the driver is actively driving with no driving assistance, then the entertainment system 150 can prevent the driver from interacting with the karaoke system. For example, only passengers may see a display of the lyrics. In addition, the driver may be prevented from using their microphone 138 so that only passengers can sing karaoke. In other driving modes, such as active driver assistance with lane and speed control, the driver may be able to sing, but may still not be provided with lyrics. These are examples of different driving modes and associated levels of karaoke experience. In other embodiments, the features available in different modes may be different than those described. For example, a driver may be allowed to sing during active driving.

Determination of driving mode may also be used by window transparency control 142 to change the transparency of windows within the vehicle. For example, one or more windows of the vehicle may be made of electrochromic glass that changes transparency based on an applied electric current. The window transparency control 142 can apply a current based on feedback from controller/GUI interface 132, vehicle systems 114, or other systems within the vehicle. For example, the window transparency control 142 can apply an electric field to one or more windows in the vehicle based on an indication from the entertainment system 150 that the user has initiated a karaoke experience, played a video, or otherwise initiated an in-vehicle experience. Accordingly, the user can have a more immersive experience without light from the outside or other distractions outside with vehicle. The window transparency control 142 may also change its action based on operation of the vehicle. For example, if the vehicle is parked and operating an entertainment experience, the window transparency control 142 may turn the windows of the vehicle opaque. However, if the vehicle is being driven and operating an entertainment experience, the window transparency control 142 may leave the windows clear. For various embodiments, the window transparency control may perform other actions depending on driving mode, in-vehicle experiences, or other parameters of vehicle operation and user preferences.

In addition to providing a karaoke experience, the entertainment system 150 may provide other entertainment experiences to passengers of a vehicle. For example, the entertainment system 150 may provide an in vehicle experiences for watching movies, television shows, or live broadcasts. The entertainment system 150 may also provide games or other entertainment experiences to the user. For some embodiments, games or other entertainment may be shared with other vehicles or remote devices in a similar manner as discussed with respect to the karaoke experience. For example, a trivia game may provide an interactive experience between different vehicles or devices. In addition, the entertainment system 150 may provide additional immersive experiences based on driving mode. For example, the entertainment system 150 may provide an indication to window transparency control 142 to black out windows in the case that the driving mode is fully autonomous or parked. The entertainment system 150 may also change where a video is played, the audio level, or other changes in an entertainment experience based on driving mode or user preferences.

Figure 2:
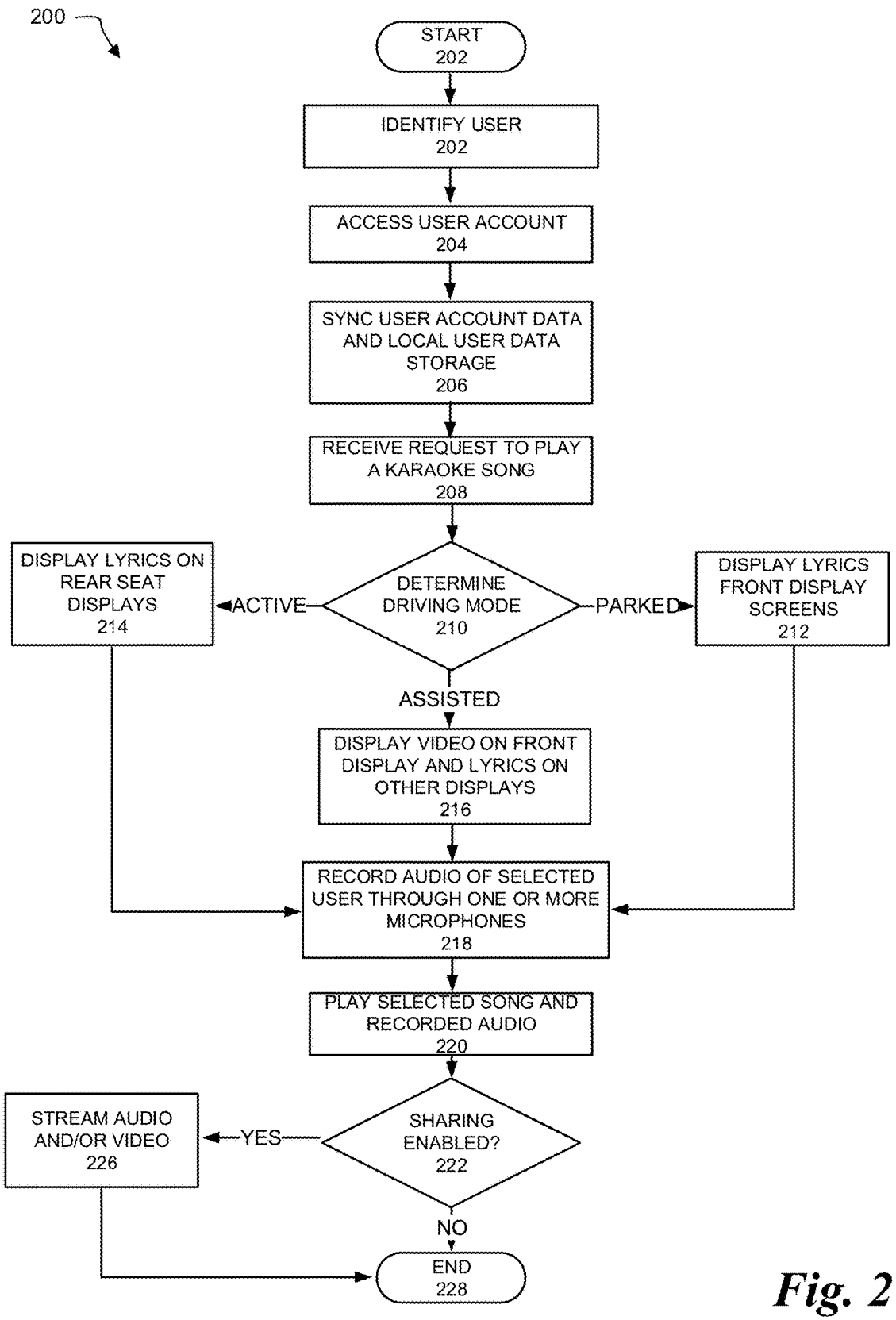
FIG. 2 is a flowchart illustrating an embodiment of operation of an entertainment system providing karaoke in vehicle, which can be used in accordance with some embodiments.

FIG. 2 illustrates an embodiment of an operation process 200 for an entertainment system. For example, the operation process 200 may be carried out by entertainment system 150 as described with respect to FIG. 1 using vehicle systems 100. The process starts at block 202 where it identifies a user accessing the system. The user can be identified an authorized using password, facial recognition, biometrics, or other data. The process then moves to block 204 and accesses the users account. To improve operation of the entertainment system, in block 206, the users account data and local user data storage are synced. This can provide downloaded lyrics and audio for particular tracks in the event that a wireless connection fails during streaming of music. In addition, this can provide additional information to an entertainment system regarding the user's preferences, contacts, events, navigation destinations, playlists, or the like.

In block 208, the entertainment system receives a request to play a karaoke song. The request can be made over voice control, touch screen control, from a local user device, or through gesture control of a display. The request may include a song request as well as other information such as a user or users in the vehicle that will sing the song, video to display during the song, or other information.

In block 210, the entertainment system determines a driving mode for the vehicle. As illustrated in process 200, the driving modes can include active, assisted, or parked. For some embodiments, there may be fewer or additional driving modes indicating different levels of autonomous driving. For example, there may only be parked and driving modes. Based on the determined driving mode, the entertainment system can determine how to display lyrics and videos for a karaoke song. The driving mode may be provided by vehicle systems 114 as described with reference to FIG. 1. In each of the potential scenarios, the entertainment system may perform steps of identifying a source for the song and lyrics. For example, the system may identify a location of the song and lyrics from a streaming source. The system may also search local user data to determine whether the audio and lyrics are available on a local source. To display the lyrics, the system can overlay the text on local video or stream video associated with the song.

In active mode, where the driver is performing normal driving functions, the entertainment system proceeds to block 214 to display lyrics on rear seat displays. The rear seat displays may be on the back of the front seat for the use of passengers sitting in the back. The lyrics may be kept from the front display to prevent distracting the driver of the vehicle.

If the entertainment system determines that the vehicle is operating in assisted mode, where advanced driver assistance systems can provide lane assistance, crash prevention, velocity control, or other driver assistance features, the entertainment proceeds to block 214 to display video on a front display and lyrics on other displays. Thus, the driver may have some improved entertainment through a video associated with the selected song, but still is not distracted by scrolling text. Rear displays or passenger side displays display videos and lyrics for the selected song.

If the entertainment system determines that the vehicle is operating in parked mode, the system proceeds to block 212 to provide a fully immersive experience to all users in the vehicle. For example, a full front display can be used to provide video and lyrics to each of the passengers. Rear displays can also be used to provide additional video output to the rear passengers. For some embodiments, the vehicle may have additional systems, such as LED lighting, heads-up display on the windshield, or other features that can be used to improve the karaoke experience while parked. For some embodiments, an autonomous driving mode may provide the same or similar experiences to when the vehicle is operating in parked mode.

After display of lyrics is appropriated initiated, the entertainment system can continue in block 218 record audio of a selected user through one or more microphones. The microphone can be a built in microphone for the vehicle, a Bluetooth microphone connected to the vehicle, or a microphone of a local user device connected over a wireless protocol. For some embodiments, a combination of speakers may be used to improve performance. For example, a combination can focus on one selected individual to block out background noises or other individuals in the vehicle. Furthermore, the entertainment system can record singing from more than one user at a time as selected by the users. For some embodiments, the entertainment system performs digital signal processing to enhance the user's voice. The processing can remove more background noises, or improve the singing quality by altering the tone of the user's voice.

At block 220, the entertainment system plays the selected song and recorded audio. The song may be a recording with vocals removed that is streamed from a remote data source or from a local data storage. The user's recorded vocals can then be played along with the selected song to provide an experience of being the singer in the song. The combined audio can be played over any number of speakers in the vehicle as set by the users.

At block 222, the entertainment system determines whether sharing is enabled. For example, the user could be streaming to another vehicle or other device to which it is connected. If sharing is enabled, the entertainment system can continue to block 226 and stream audio to the connected vehicle or device. For some embodiments, sharing the audio can include sharing just the recorded voice of the user or it could include sharing both the recorded voice and the song in a combined track. For some embodiments, a camera also captured video of the singer. Accordingly, the video could also be streamed to another connected vehicle or device. For some embodiments, recording of audio and or video could also be posted to a social network or stored for later sharing. If the sharing is complete or the user has chosen not to share the karaoke session, the process ends at block 228.

Figure 3A:
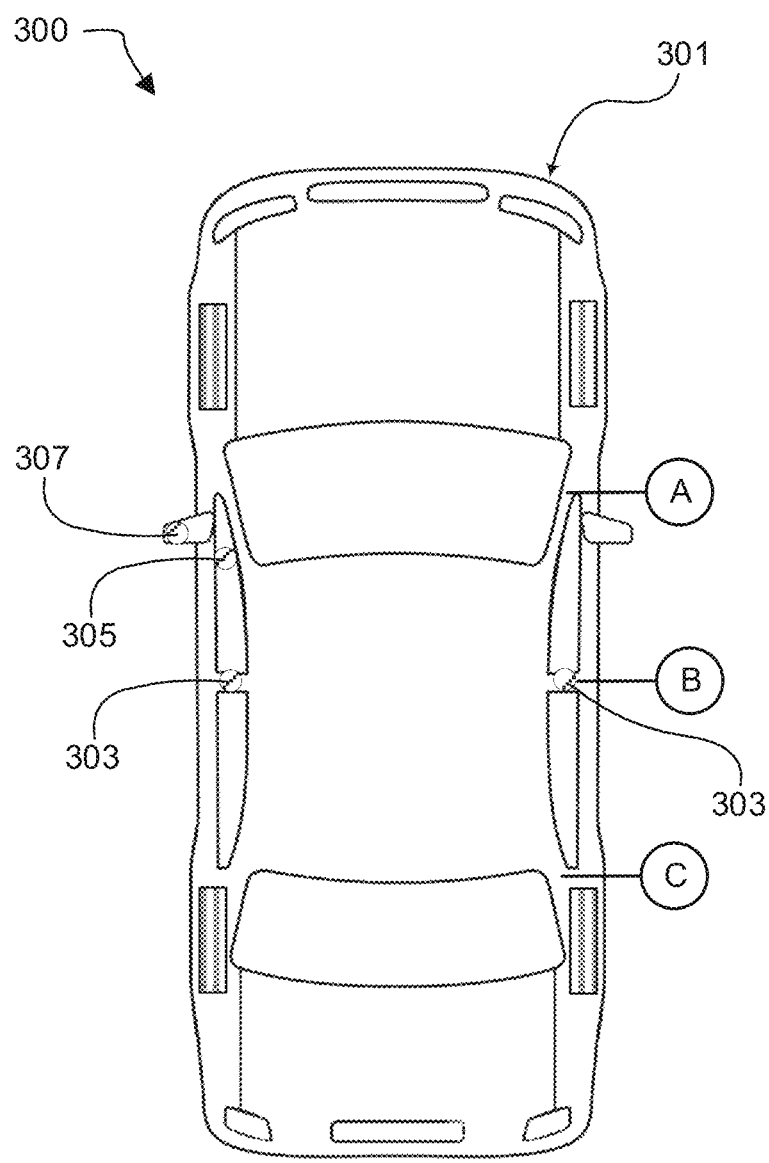
FIGS. 3A-3C are diagrams of a vehicle providing karaoke, which can be used in accordance with some embodiments.
Figure 3B:
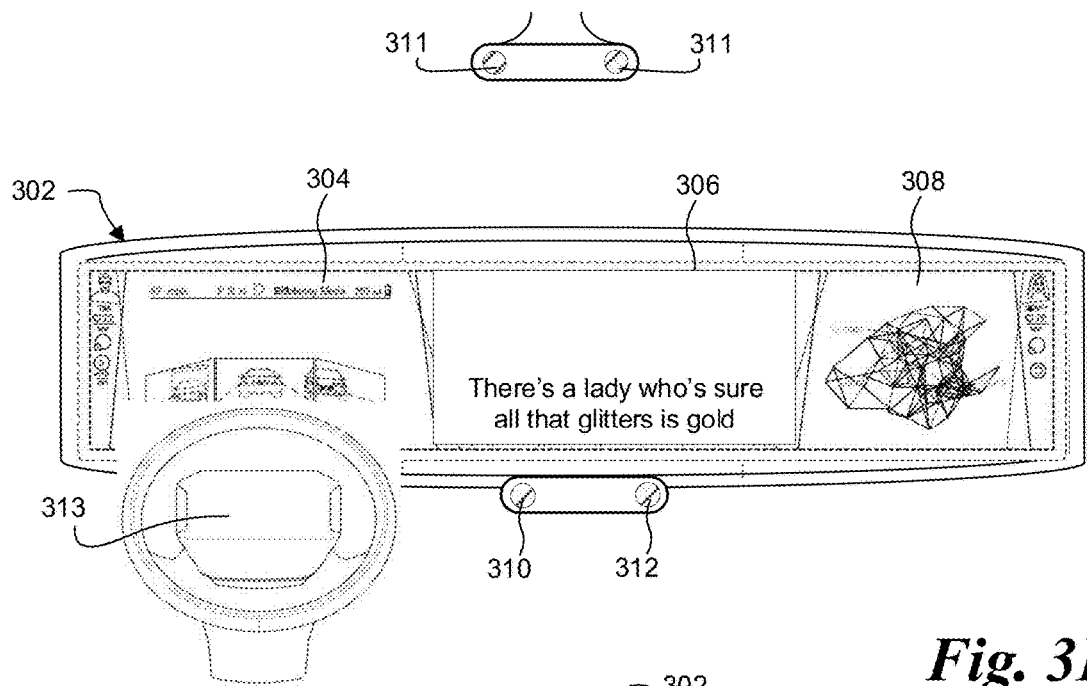
Figure 3C:
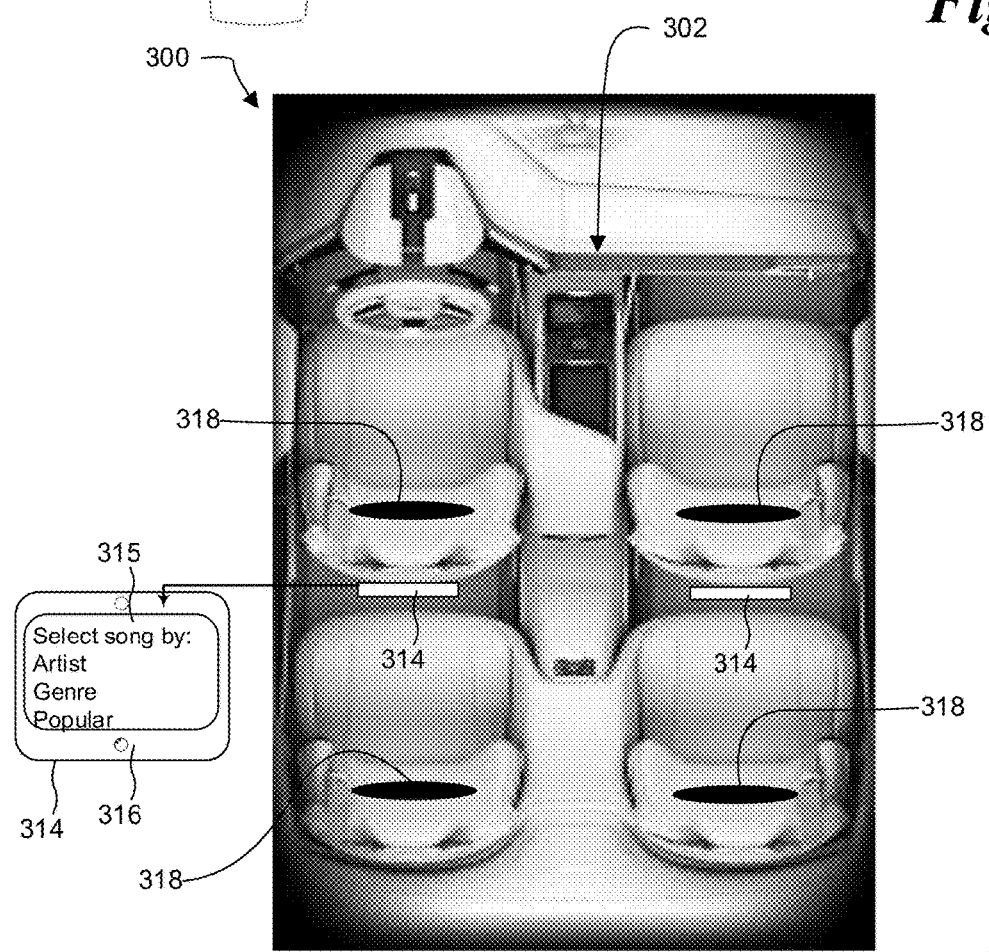

FIGS. 3A-3C illustrate details of an automobile implementation of system 100. The different components described are coupled to each other substantially as system 100 and the elements of system 100 not shown in the drawings can be put elsewhere in the vehicle, for instance in the dashboard or in the trunk.

FIG. 3A illustrates an embodiment 300 of the placement of user ID sensors on the exterior of a vehicle 301. Many vehicles include 3 pillars: an A pillar on both the driver and passenger sides between the windshield and the front side windows; a B pillar on both the driver and passenger sides between the front and rear side windows; and a C pillar on both the passenger and driver sides between the rear side window and the rear window.

In an embodiment, the user ID sensors are facial recognition cameras positioned on the B pillar on both the driver and passenger sides of the vehicle to identify the driver and passengers before they enter the vehicle. But in other embodiments cameras can be positioned differently. For instance, a facial recognition camera 305 can be placed in the vehicle's interior pointing outward through the side window so as to capture an image of the face of the driver. In yet another embodiment, a facial recognition camera 307 can be put on the driver's side mirror. In other embodiments other types of sensors can be used and can be positioned differently than shown. For example, in an embodiment using fingerprint recognition fingerprint sensors could be put on the doors along the bottom of the windows. The result of user identification can be used to log into one or more sets of user data associated with a karaoke system. The user data can define preferences and playlists for the users as well as previously recorded karaoke sessions. For some embodiments, the user identification systems may be placed inside the vehicle instead of on exterior surfaces of the vehicle.

FIG. 3B illustrates an automobile dashboard 302 which includes a plurality of displays. In the illustrated embodiment dashboard 302 includes a single display which can be configured to display different things in three software-configurable display regions 304, 306, and 308, but in other embodiments dashboard 302 can have a different number of display regions than shown and in still other embodiments regions 304, 306, and 308 can be physically separate displays. Dashboard 302 also includes microphones 310 and 312 positioned below display regions 304, 306, and 308, where they can capture audio from one or more of the driver or a front passenger. Speakers 311 can also be positioned in the cabin, for instance where a rear-view mirror is or, if not present, where it normally would be, to provide audio output to passengers of the vehicle. For some embodiments, the vehicle may also include one or more cameras to record the passengers, perform facial recognition on the passengers, or to perform gesture recognition. A display 313 can be positioned in the center of the steering wheel to act as a user input device and to provide additional display capabilities for the driver.

As shown in FIG. 3B, the middle display 306 provides lyrics to a song selected for karaoke. For some embodiments, the song lyrics may only be displayed on one of displays 304, 306, or 308 in the case that the vehicle is parked or in a fully autonomous driving mode. For some embodiments, display regions 304 and 308 may also provide the lyrics, video, or effect associated with the song. For example, display 308 can display a visual effect related to the song or the performance of an individual. The visual effect displayed in display region 308 can change based on the accuracy of a singer, for instance.

FIG. 3C is a plan view of an automobile interior 320. Automobile interior 320 includes dashboard 302 and also includes a driver's seat, a front passenger seat, and two rear passenger seats. As described above display regions 304, 306, and 308 in dashboard 302 provide displays for persons seated in the driver's seat and the front passenger seat. To provide displays for persons sitting in the rear passenger seats, rear passenger displays 314 can be positioned in the backs of the driver's seat and the front passenger seat. Each rear passenger display 314 includes a display unit on which song lyrics and visuals can be provided. The displays 314 may also include a speaker 315 and camera 316. For some embodiments, the dashboard 302 and the rear displays 114 may also provide a control mechanism for controlling the entertainment system. For example, as shown in rear display 114, a user can search for and select songs to cue for karaoke. For some embodiments, the rear passengers can also perform through the speaker 315 and the camera 316.

For some embodiments, the vehicle includes a feedback mechanism 318 positioned in the back of the driver's seat, as well as in the back of the front passenger seat and the backs of the rear passenger seats to provide haptic feedback to users regarding performance. Each person occupying a seat in the vehicle can thus during their turn performing on a karaoke system receive feedback on their quality. For instance, haptic feedback may be provided indicating that a beat was missed or lyrics missed by the performer.

Figure 4:
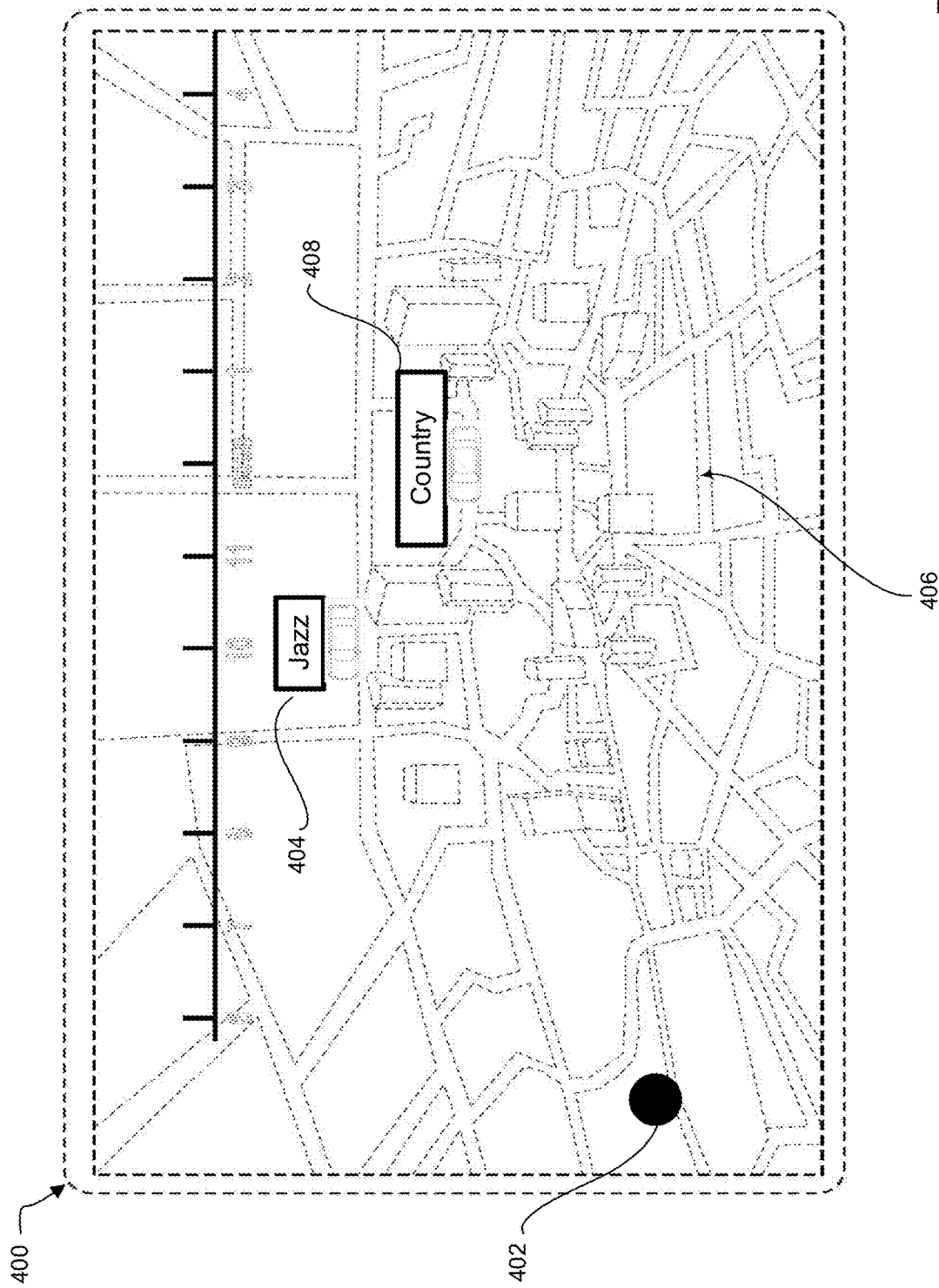
FIG. 4 is a diagram of an embodiment of a map display, which can be used in accordance with some embodiments.

FIG. 4 illustrates an embodiment of a map display 400 used with a karaoke system. FIG. 4A illustrates an embodiment of the basic layout of a map display 400 with potential meet-up locations 402 and additional vehicles 404, 408. The map may be generated or modified by entertainment system 150 as described with reference to FIG. 1 in combination with navigation data and data from remote data sources. Map 406 is shown as a three-dimensional navigation map, but in other embodiments map 406 can be two-dimensional. Whether three-dimensional or two-dimensional, map 406 can also include additional features such as satellite views, street views, or three-dimensional views (e.g., like Google Earth).

Meet-up location 402 can be determined locally by an entertainment system, or from a remote data source that determines a potential meet-up location based on an event, the location of users, the route in navigation systems of users, or the like. For some embodiments, a user in a vehicle can propose a meet-up location 402 that is then advertised on the map 406 in other vehicles or devices. The meet-up 402 location can be used to bring vehicles together to perform karaoke. A user can select the meet-up location 402 from the map and a navigation system can then automatically change the current route to the selected meet-up location 402.

Additional vehicles 404 and 408 can be shown within the local vicinity of the vehicle. The additional vehicles may be shown on the map based on their privacy preferences and the preferences of the user of the map display 400. A user can filter other vehicles 404 and 408 from all vehicles in the area based on current use of a karaoke system, genre preferences, artist preferences, or other information about users such as age. Vehicles may also be filtered based on those attending or leaving a particular event. For some embodiments, additional information may be shown on map 406 such as a location of a venue or event, a route the user is taking, or the like. For some embodiments, users can achieve scores based on performance of particular songs, number of songs they have sung, or other performance metrics. For example, performances may be scored based on digital signal processing of a user's performance as compared to the expected rhythm and notes. These scores can be used to generate different awards or levels for different users. For some embodiments, those scores, levels, badges, or the like can be shown on a map interface 400 along with the location of a user. The scores may also be used to compete with other vehicles or different passengers in a vehicle. For example, two vehicles may each perform the same song and receive associated scores. Those scores can then be compared to determine a winner or award points. The karaoke system may also determine different scores for different users or areas of a vehicle. For example, the front seats may compete against the back seats for a high score when performing a song. Other competitive scoring may also be generated for particular users within a vehicle or between one or more users of the vehicle and another remote device.

Map 406 is shown as a three-dimensional navigation map, but in other embodiments map 406 can be two-dimensional. Whether three-dimensional or two-dimensional, map 406 can also include additional features such as satellite views, street views, or three-dimensional views (e.g., like Google Earth). The map display 400 may be provided in one of the displays 304, 306, 308 or 314 as shown with reference to FIG. 3C. The map display 400 may also be provided on a user device separate from, but connected to a vehicle providing the karaoke experience.

Figure 5:
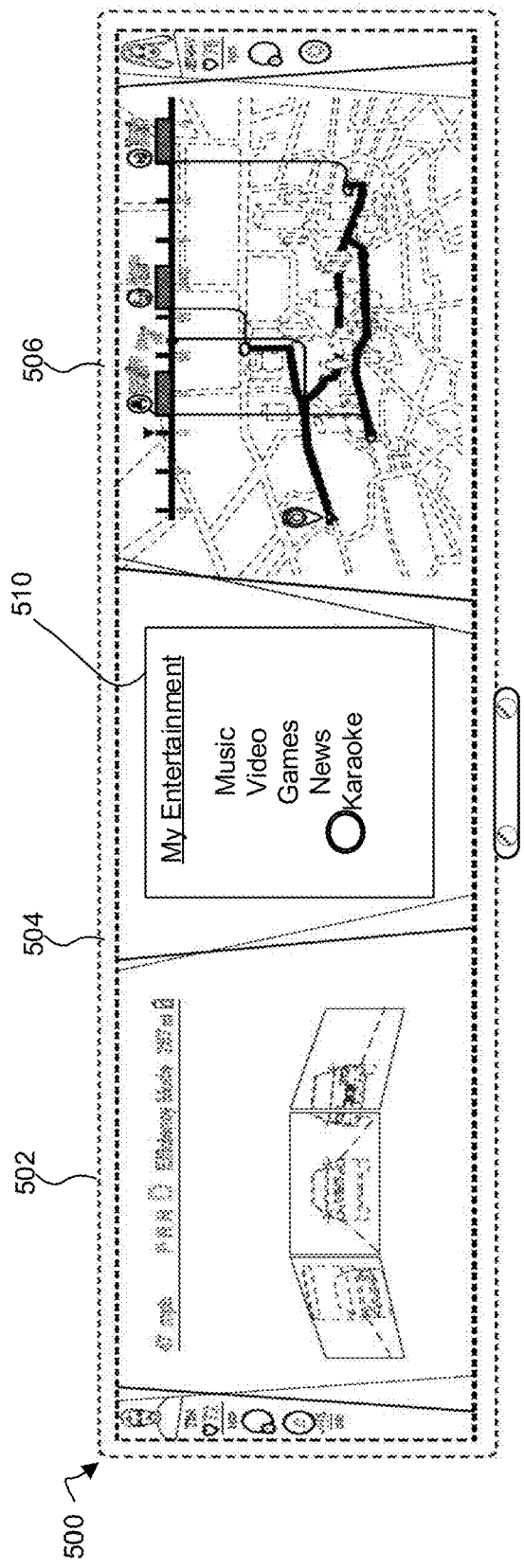
FIG. 5 is a diagram of a control screen display, which can be used in accordance with some embodiments.

FIG. 5 illustrates an automobile dashboard 500 which includes a plurality of display 502, 504, 506. For some embodiments, dashboard 500 may be the same or similar to dashboard 302 described with reference to FIGS. 3A-3C. In the illustrated embodiment dashboard 500 includes a single display which can be configured to display different things in three software-configurable display regions 502, 504, 506, but in other embodiments dashboard 500 can have a different number of display regions than shown and in still other embodiments regions 502, 504, 506 can be physically separate displays. As shown in FIG. 5, the middle display 504 provides a control screen 510 for an entertainment system. For some embodiments, display regions 502 and 508 may also provide the lyrics, video, or effect associated with a currently playing song. The user can use voice, gesture, or touch screen control to navigate control screen 510. This can enable selection of karaoke or other entertainment apps or features. The control screen 510 can enable additional features such as connecting to other vehicles or devices, sharing karaoke sessions, posting karaoke sessions, selecting songs or videos, or interacting with other features of a karaoke system.

Figure 6:
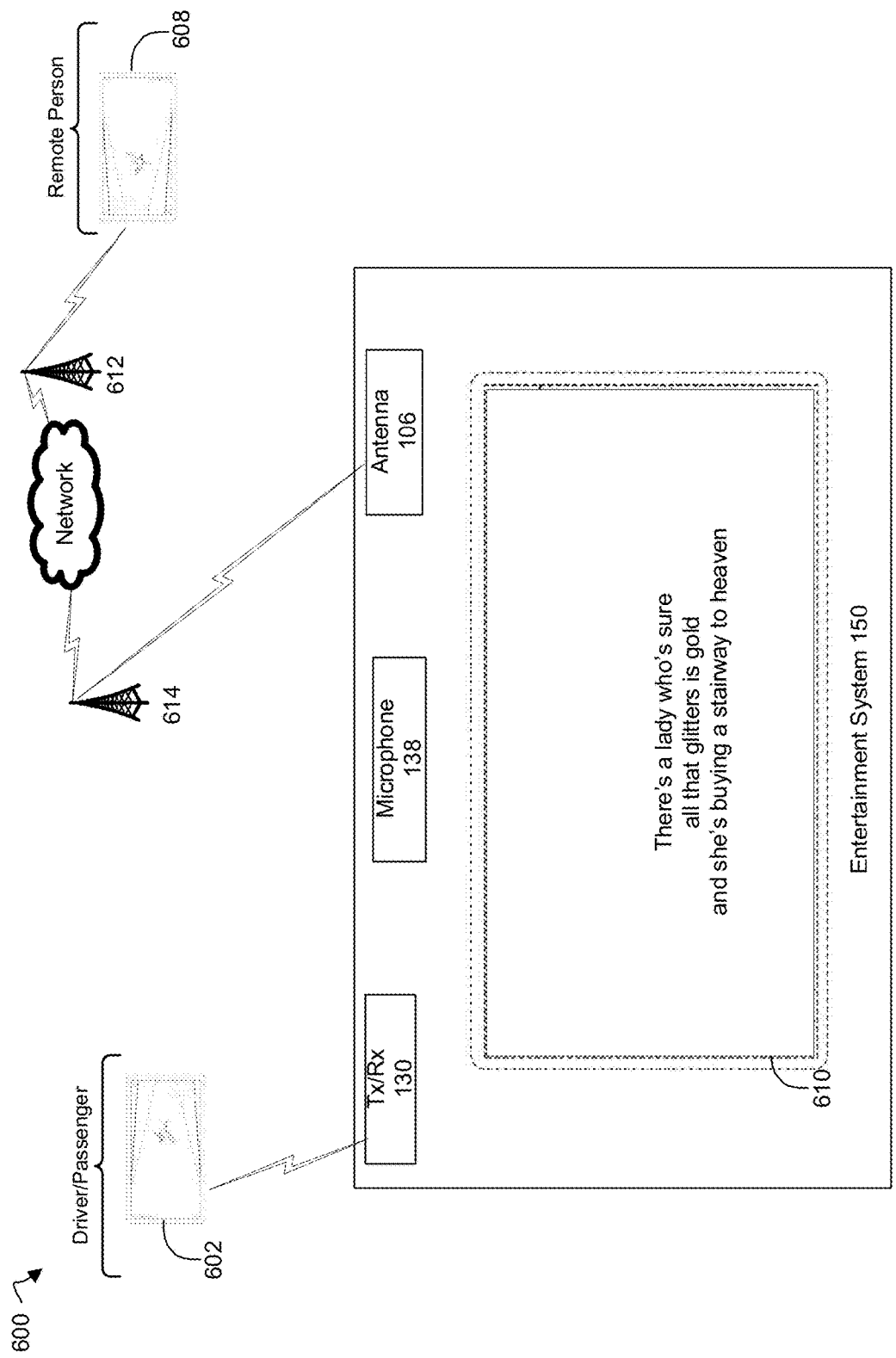
FIG. 6 is a diagram of an embodiment of interaction and data exchange between an entertainment system providing karaoke and other devices, which can be used in accordance with some embodiments.

FIG. 6 illustrates an embodiment of a system 600 in which there can be interaction and data exchange between an entertainment system 150 and other vehicles or devices. In FIG. 6, these devices are described as smartphones, but the same systems and processes can be applied to other vehicles, smartwatches, laptops, tablets, or other electronic devices. In system 600 the driver, the passenger, or both, can have devices such as a smartphone 602. These kinds of devices are usually carried on the user, so if they belong to the driver and passenger they will be inside the vehicle. In the illustrated embodiment, smartphone 602 can communicate wirelessly with transceiver 130 via a wireless connection such as Bluetooth. For other embodiments one or more of the connections shown, such as between smartphone 602 and transceiver 130, can be wired instead of wireless. For example, the smartphone 602 may be plugged into an auxiliary or USB port of the vehicle.

A remote person—that is, someone outside the vehicle can also have a device such as smartphone 508. Smartphone 508 can communicate with an antenna 512, for instance the antenna on a Wi-Fi router or a cellular antenna located on a tower. Antenna 512 and its associated electronics can exchange information, for instance via a network such as the internet, with another antenna 514, such as a cellular antenna or Wi-Fi. Antenna 514 can then send data to and receive data from antenna 106, which is on or in the vehicle (see FIG. 1).

System 600 allows the driver and/or passengers to exchange data with one or more persons remote from the vehicle. For instance, a driver using entertainment system 150 can share the performance recorded with microphone 138 with the remote person 608. Thus, the user can sing the lyrics with the audio of a song as presented on an interface 610 of the vehicle. The recording from the microphone 138 can then be transmitted wirelessly to a remote person 608. The recording can also be transferred through the wired or wireless connection to the smartphone 602 that can store the recording for later viewing, inside or outside the vehicle. For some embodiments, additional data such as video, lyrics, performance metrics (singing accuracy), or the like can also be shared. Other types of data can also be exchanged. For instance, the remote person smart watch or smartphone can transmit the person's current location or, can transmit messages from the remote user to the driver or passenger, can change a meeting time with the driver or passenger (which could be reflected in a navigation system), or other information about events, users, or data regarding the karaoke performance.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. An in vehicle entertainment system comprising:
    a memory device; and
    a computer operatively coupled to the memory device, wherein the computer is to:
        receive a song selection from a user in the vehicle of a karaoke song;
        determine one or more displays on which to display relevant text for the song in response to detection of a driving mode of the vehicle;
        record, with a microphone in the vehicle, an audio performance of the song by the user; and
        overlay the audio recording with the song over a speaker in the vehicle.

2. The in vehicle entertainment system of claim 1, wherein the microphone is a wireless microphone, and wherein to record the performance, the computer is further to detect that the wireless microphone is associated with the user and connect to the wireless microphone.

3. The in vehicle entertainment system of claim 1, wherein the vehicle further comprises displays and the computer is further to:
 detect, in response to receiving the request, that the vehicle is in a fully autonomous mode; and
 display the relevant text on the display in direct view of a driver of the vehicle in response to detecting that the vehicle is in the fully autonomous mode.

4. The in vehicle entertainment system of claim 1, wherein the vehicle further comprises a navigation system and the computer is further to:
 receive a location provided by a remote source for meeting to perform karaoke; and
 update the navigation system of the vehicle to navigate to the selected location.

5. The in vehicle entertainment system of claim 1, wherein the vehicle further comprises a transceiver and the computer is further to:
 connect to a remote device over a network; and
 transmit, through the transceiver, the audio recording to the remote device over the network.

6. The in vehicle entertainment system of claim 5, wherein the remote device is one of a second vehicle, a smartwatch, a laptop, or a tablet.

7. The in vehicle entertainment system of claim 1, wherein the vehicle further comprises a transceiver and the computer is further to:
 connect to a remote device over a network;
 receive, through the transceiver, a second performance recording from the remote device over the network; and
 display the performance on at least one of the one or more displays in the vehicle.

8. The in vehicle entertainment system of claim 1, wherein the computer is further to:
 receive audio data from a remote device of a second performance of the song; and
 combine the audio recording and the second performance.

9. The in vehicle entertainment system of claim 1, wherein the computer is further to:
 detect that the vehicle is in a parked mode or a fully autonomous mode; and
 provide an electrical signal to a window of the vehicle to cause the window to become opaque.

10. The in vehicle entertainment system of claim 1, wherein the computer is further to:
 receive a request to play a video in the vehicle; and
 display the video on one or more display according to a detected driving mode of the vehicle.

11. The in vehicle entertainment system of claim 1, wherein the computer is further to:
 generate a first score for the recorded audio performance; and
 compare the first score to a second score received from a remote device.

12. A non-transitory computer-readable medium having instructions stored thereon that, when executed by a computer, cause the computer to:
 receive a song selection from a user in the vehicle of a karaoke song;
 determine one or more displays on which to display relevant text for the song in response to detection of a driving mode of the vehicle;
 display the relevant text for the song on the determined displays;
 record, with a microphone in the vehicle, an audio performance of the song by the user; and
 overlay the audio recording with the selected song over a speaker interior of the vehicle.

13. The non-transitory computer-readable medium of claim 12, wherein the computer is further to:
 connect to a remote device over a network; and
 transmit, through a transceiver, the audio recording to the remote device over the network.

14. The non-transitory computer-readable medium of claim 12, wherein the computer is further to:
 detect, in response to receiving the request, that the vehicle is in a parked mode; and
 display the relevant text on a display in the vehicle within direct view of a driver of the vehicle, in response to detecting that the vehicle is in a parked mode.

15. The non-transitory computer-readable medium of claim 12, wherein the computer is further to:
 detect, in response to receiving the request, that the vehicle is in a driving mode; and
 prevent displaying of the relevant text on a display within direct view of a driver of the vehicle in response to detecting that the vehicle is in a driving mode.

16. The non-transitory computer-readable medium of claim 12, wherein the computer is further to:
 detect a position of a second vehicle operating a karaoke application; and
 indicate a position of the second vehicle on a display of the vehicle.

17. A method comprising:
 receiving a request from a user in a vehicle to play a karaoke song;
 receiving lyrics and audio for the karaoke song from a data source connected to the vehicle;
 displaying, to at least the user, relevant text of the song from the received lyrics;
 recording, with a microphone in the vehicle, audio of a performance of the song by the user; and
 overlaying the audio recording with the song over a speaker in the vehicle.

18. The method of claim 17, further comprising:
 connecting to a second vehicle over a network; and
 transmitting the audio recording to the second vehicle over the network.

19. The method of claim 17, further comprising:
 recording, with a camera in the interior of the vehicle, a video of the performance of the song;
 connecting to a second vehicle over a network; and
 transmitting the audio recording and the video recording to the second vehicle over the network.

20. The method of claim 17, further comprising:
 detecting, in response to receiving the request, that the vehicle is in a parked mode; and
 displaying the relevant text on a display within direct view from a driver's seat of the vehicle in response to detecting that the vehicle is in a parked mode.

21. The method of claim 17, further comprising:
 detecting, in response to receiving the request, that the vehicle is in a driving mode; and
 preventing display of the relevant text on a dashboard display within direct view from a driver's seat of the vehicle in response to detecting that the vehicle is in a driving mode.

22. The method of claim 17, further comprising:
 detecting a position of a remote device operating a karaoke application; and
 indicating a position of the remote device.

23. The method of claim 22, further comprising displaying a song, genre, or artist playing within the karaoke application of the second vehicle.

24. The method of claim 17, further comprising setting a meet-up location based on an event associated with user data of the user.

25. The method of claim 17, further comprising:
receiving a message from a remote device; and
displaying the message from the remote device to the user.

\* \* \* \* \*